Figure 1:
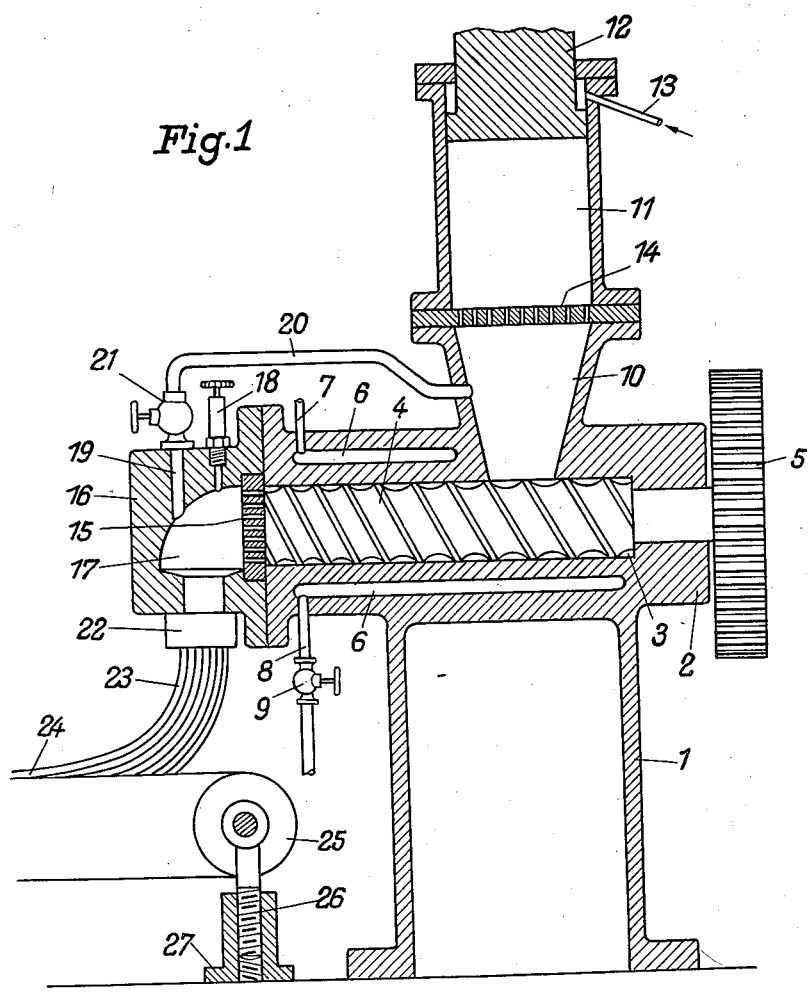

Nov. 7, 1939.　　　M. DRAEMANN　　　2,178,955
PRODUCTION OF RUBBER FILAMENTS

Filed July 2, 1934

Inventor:
Max Draemann
By
his Attorney

Patented Nov. 7, 1939

2,178,955

UNITED STATES PATENT OFFICE 2,178,955

PRODUCTION OF RUBBER FILAMENTS

Max Draemann, Cologne-Braunsfeld, Germany

Application July 2, 1934, Serial No. 733,420
In Germany July 31, 1933

10 Claims. (Cl. 18—8)

This invention relates to the art of making rubber threads, rubber filaments and similar rubber articles, more particularly to such processes and machineries by which a plastic rubber mass is extruded through a nozzle of a suitable cross-section.

One object of the invention consists in rendering such processes more efficient and less liable to practical difficulties.

Another object is to provide a rubber composition which may be shaped in the form of threads or filaments without resorting to coagulating baths.

Still another object is to provide a machinery for shaping such rubber compositions in the form of threads and filaments being particularly uniform in cross-section.

Still other objects will appear in the following description of the invention:

It has already been proposed to make rubber threads by extruding a viscous solution of rubber in a suitable solvent through nozzles at the outlet of a hydraulic press. In doing so considerable difficulties were, however, experienced, owing to the fact that the slightest lack of uniformity, which is practically unavoidable in rubber compositions of that type, causes the final product to vary considerably in diameter, which is highly objectionable from the weavers' point of view.

In order to avoid this drawback, it has been proposed to make such rubber threads of latex thickened to the consistency of cream and allowed to pass, under the very slight pressure due to its own head of liquid, into a coagulating bath underneath. However, as the jets of latex remain soft and sticky for a considerable time after entering the coagulating bath and as the specific gravity of such baths is regularly much higher than that of the latex, this process has so far been of little commercial value in spite of various efforts to develop and improve it.

According to my present invention I overcome the disadvantages of both of the above mentioned processes by extruding through the nozzles of a suitable press a latex composition to which I had previously imparted such a high viscosity that it would not flow through the nozzles under any head of liquid of a magnitude feasible commercially and that it quickly solidifies under the sole influence of the air after emerging from the nozzles, thus obviating the need for coagulating baths as well as the difficulties involved in their use.

Experience has shown that latex, concentrated so as to display the high viscosity required in carrying out the present invention, must contain at least 65 per cent of solid constituents. Still better results are obtained when using a latex containing as much as 80 per cent or even more solids. Filling, curing and dyeing ingredients may be incorporated with the latex provided that care be taken not to destroy the uniformity of the composition.

It will be understood that latex, being a rubber dispersion contained in a watery dispergent, can readily be obtained, and usually already is in a state of extremely uniform composition, and this is so even at the very high concentrations mentioned above. On extrusion, the fine jets of this semi-liquid mass dry quickly under the sole influence of the air, yielding a rubber filament or thread of a uniformity in composition and diameter which could not be obtained with processes hitherto known. Moreover, the air-drying step, during which the filaments are kept freely suspended from the nozzles from which they emerge is much more simple and reliable than the coagulating step which it makes superfluous, and it even permits the half dried filaments to be sprayed with some suitable fine dust or powder capable of reducing the surface friction of the final product, such as talcum powder.

When the filaments are practically dry, they may be received by a suitable conveyor such as a band conveyor and carried through a vulcanizing zone. Naturally, this latter step may be dispensed with when vulcanization is not desired or when the latex used is of the vulcanized type which, in view of still other properties, is particularly suitable for carrying out the invention.

One suitable way of thickening the latex to the high extent required consists in concentrating or evaporating it by one of the usual methods, with or without using suitable expedients such as protective colloids, stabilizers and the like, but this treatment may also be replaced partly or wholly by one of the following methods:

The viscosity of latex, preferably of a partly concentrated one, may be increased to the required extent by an addition of carefully controlled amounts of a suitable coagulating agent such as aluminium sulfate.

On the other hand, an increase in viscosity by a similar partial coagulation may be brought about by the addition to latex of a suitable solvent for rubber such as benzene, petrol ether and similar hydrocarbons. The mass thus obtained has been proved to display a much higher uniformity in composition than similarly viscous solutions of solid rubber when the same solvents are used.

Comparatively diluted solutions of solid rubber in hydrocarbons can be obtained in a sufficiently homogeneous and uniform state, in contradistinction to viscous and concentrated rubber solutions. For this reason and in view of the fact that rubber solutions are usually much cheaper than rubber latex, the extrusion mass required in carrying out the present invention can be replaced advantageously by an intimate mixture of latex and a solution of rubber in a hydrocarbon or a similar solvent. The solvent contained in a solution of the latter type also exerts a coagulating effect on the colloid rubber particles of the latex. Experience has shown that such mixed compositions, even if they contain a very high percentage of dissolved rubber, yield results little different from those obtained with pure latex. In view of this fact it seems likely that such mixtures also represent colloidal dispersions in which the watery serum originating with the latex plays an important role.

This latter presumption would also account for the fact that rubber compositions having similar properties and being similarly useful in the practice of the present invention can be made from solid rubber and from comparatively small proportions of latex by still other methods, provided that care is taken to retain in the mixture at least part of the watery serum of the latex. For instance solid rubber, either masticated or not, and a proportion of latex down to as little as 10 per cent of the total, may be transformed mechanically into a homogeneous mass with or without the addition of a hydrocarbon solvent. Alternatively the solid rubber or the latex or both may first be treated with such a hydrocarbon.

Fillers, vulcanizing and dyeing agents, and other compounding ingredients may be incorporated with the mixture at any stage of its preparation, although it is preferable to incorporate them with the latex while still in a fluid state, for instance before evaporating it.

*Example 1*

150 parts by weight of rubber in the form of commercial, partly concentrated and preserved latex are intimately mixed with 3.3 parts (by weight) of finely divided sulphur, 8.3 parts of zinc oxide, 3.0 parts of transformer oil and a suitable amount of a vulcanizing accelerator, for instance 0.3 zinc-diethyl-dithiocarbamate. This mixture is then concentrated by evaporation in vacuo, under constant stirring, until its consistency is that of a tough dough. This point will be reached when the total weight of the composition (including water) has been reduced to a weight between about 250 to 200 parts, furthermore the consistency is regulated by adding about 1–3% paraffine. The more this composition is concentrated, the quicker the threads made of it by extrusion will dry under the influence of the air so as to acquire a strength sufficient for further handling, but the pressure required to extrude such composition will increase simultaneously.

*Example 2*

A mixture of partly concentrated latex, vulcanizing and filling ingredients etcetera as described with reference to Example 1 is intimately mixed with a watery solution of aluminium sulphate so as to bring about a partial coagulation of the latex. The viscosity of the composition is thereby increased considerably, and the amount of the coagulating agent should be controlled so as to obtain a final viscosity not lower than that obtained in accordance with Example 1; or, speaking more precisely, not lower than that of a concentrated latex composition containing 65 per cent by weight of rubber and other solid constituents.

The influence exerted by the aluminium sulphate partly depends upon the origin and the previous treatment of the latex, and therefore the exact amount of the coagulant required to obtain a suitable viscosity must be ascertained by preliminary experiments, but in view of the above statements no difficulties will be encountered in doing so.

Instead of aluminium sulphate other inorganic or organic coagulants of any description may be used, such as salts, acids, alcohols, etc. the amounts thereof being ascertained in a similar way. As the number of substances specifically known as coagulants for rubber latex is considerable, and as they are entirely familiar to those skilled in the art, I abstain here from enumerating them individually.

*Example 3*

A mixture of latex, vulcanizing and filling ingredients as described in Example 2 is coagulated, and turned into a homogeneous viscous mass by stirring, by an addition of a solvent for rubber of the hydrocarbon type such as for instance benzene, petrol ether or the like. For instance, a latex composition containing about 150 parts by weight of rubber is mixed, under constant stirring, with about 80 parts by weight of a mixture of benzene and petrol ether.

*Example 4*

50 parts by weight of rubber in the form of commercial, partly concentrated latex, 100 parts of rubber in the form of comminuted smoked sheets, sulphur, fillers and an accelerator in the proportion given in Example 1, and about 80 parts of benzene are worked into a homogeneous mixture.

The proportion of rubber in the form of latex and in the form of solid raw or masticated rubber may be varied within a wide range, but it is essential that the final composition contain a distinct proportion of water originating with the latex serum.

Especially with comparatively small proportions of solid rubber it is recommendable to soak or dissolve the rubber in the hydrocarbon, the mixture with the latex being brought about only thereafter.

*Example 5*

An intimate mixture of latex, sulphur, a filler and a vulcanizing agent as described in Example 1 and a solution of 20 parts of raw rubber in 100 parts of petrol ether are thoroughly mixed with each other in a proportion yielding a homogeneous composition with a viscosity within the range stated in Example 1.

Any masses produced in accordance with the different methods mentioned above may be mixed with each other before extruding.

In the extruding step care should be taken to avoid the formation of air bubbles in the viscous rubber composition, and it is advantageous to use an extruding press in which the flowing mass is subjected to a gradually increasing pressure so as to facilitate the timely removal of any bubbles present.

The viscous rubber compositions made in accordance with one of the prescriptions given above may be shaped to form filaments or threads by means of one of the hydraulic presses usual for such purposes, but special care should be taken to avoid even the slightest variations of such physical conditions as for instance temperature or pressure which would influence the rate of flow of the rubber mass through the nozzles. Furthermore, the receptacle or cylinder of such presses should be large enough to hold as much of the rubber mass as is required to extrude filaments of the required length in a single uninterrupted operation, since a refilling of such receptacles usually causes a breaking off of the filaments.

As this latter condition regarding the size of the receptacles cannot be complied with in cases where very long threads are to be produced, and in order to dispense definitely with the consequences of a lack of uniformity of the viscous rubber mass to be extruded, the present invention further comprises a special method and special means for carrying out the extruding step.

This method consists, broadly speaking, in forcing the rubber mass through the nozzles not by a constant pressure as is exerted by the usual hydraulic presses, but, by means of a suitable mechanism, at a constant volumetric rate, irrespective of variations in viscosity or of variations in resistance to flow. Consequently, the pressure exerted on the mass should not be kept constant, but should vary in close accordance with the first mentioned variations.

Within certain limits, a press substantially consisting of a positively driven conveyor screw answers these requirements and delivers a fairly constant volume per unit of time depending only on the speed of revolution of the screw, while the pressure exerted on the mass adjusts itself automatically in accordance with the resistance to flow due either to changes in viscosity or to any other causes.

Where a very high pressure is required to force the rubber through the nozzles, or where the friction between the surface of the screw and the rubber mass is comparatively small, presses of this type may fail to force the mass through the nozzles at a constant volumetric rate. In further development of the present invention I have, however, found that such limitations of the range of proper functioning, due to "slip", do not occur if the press represented by the screw conveyor is backed by another press, which may as well be a hydraulic press exerting a constant pressure, provided that this feeding press or feeding apparatus supplies the rubber mass to the conveyor screw under a pressure high enough to overcome any back-pressure possibly existing at the inlet of the screw conveyor. Furthermore it is desirable that the pressure exerted by the first or feeding press should be higher than that required to overcome the elasticity of the rubber mass.

If the inlet of the press formed by the screw conveyor is enlarged to form an intermediate receptacle, the cylinder of the first press may be refilled while the screw conveyor is kept working, thus enabling the manufacture of rubber threads of unlimited length.

With a feeding pressure of a sufficient height it is further possible to insert one or more refining sieves in the path of the rubber mass so as to comminute and destroy any lumpy particles contained in the latter.

Where the rubber mass contains a solvent having a comparatively low boiling point it has hitherto been necessary to keep the mass at a comparatively low temperature. When using a preliminary or feeding press according to the present invention no such limitations exist, and it is even possible to heat the rubber mass contained in the press to a temperature above the boiling point of the solvent, the formation of bubbles being prevented by a suitable high pressure. On emerging from the nozzles such a. highly pre-heated mass solidifies extremely rapidly because of the almost instantaneous evaporation of the over-heated solvent.

The viscosity of rubber masses as well as their frictional properties depend to a certain extent on whether the mass is kept resting or in motion. Partly for this and partly for other reasons I have found it advantageous to operate the screw conveyor at a higher speed than that required to force the predetermined quantity of rubber mass through the nozzles, and to tap off a corresponding part of such mass at a point between the front end of the screw and the nozzles, leading that tapped-off portion back to the rear of the conveyor screw, or to any other convenient point of the apparatus. The amount thus recirculated may be made as large as and even much larger than the portion actually forced through the nozzles during the same interval, thus ensuring a speedy movement of the mass as well as an enhanced uniformity thereof. This is particularly so if sieves exerting a refining and mixing effect are inserted in the path of the mass.

The machine with a by-pass described above can be used with great advantages for extruding pure rubber solutions, the repeated turning over of the rubber solution improve considerably the uniform thickness of the thread.

A pure rubber solution to be extruded by a machine with by-pass is about the following:

*Example 6*

| | Units of weight |
|---|---|
| Raw rubber are mixed with | 100 |
| Zinc oxide | 2 |
| Paraffine | 1 |
| Stearine | 1.5 |
| Vulcanizing accelerator | 1 |
| Sulphur | 2.5 |
| Benzine or petrol ether | 100 |

A device for carrying out the present invention is illustrated in the drawing by way of example.

Figure 2:
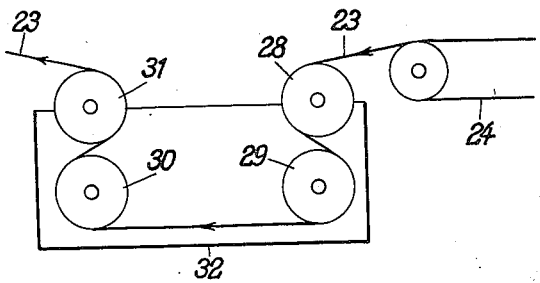

In the drawing Fig. 1 represents a sectional elevation of a double press for shaping rubber threads. Fig. 2 is a diagrammatic sectional elevation of a stretching device forming part of the equipment.

In Fig. 1 the stand or base 1 carries a cylindrical body 2, in a suitably shaped bore 3 of which the conveyor screw 4 is located. The cogwheel 5 attached to the rear of the shaft of the conveyor screw co-operates with driving means (not shown). The pitch of the screw decreases in the direction of the movement of the rubber mass so as to exert on the latter a steadily increasing pressure which tends to remove any bubbles contained in the mass. The steam jacket 6 provided in the body of the cylinder is connected with the steam inlet 7 and with an outlet 8 controlled by valve 9 and serves for keeping the rubber mass to be extruded at a predetermined temperature.

The inlet 10 of the press thus formed is enlarged to serve as an intermediate receptacle, and on top of it a hydraulic press is arranged, comprising a cylinder or receptacle 11 and a piston 12 forced in a downward direction by means of water admitted under pressure through pipe 13. Between the hydraulic press 11, 12, 13 and the inlet 10 a refining sieve 14 is inserted.

Another refining sieve 15 is arranged immediately in front of the end of the conveyor screw which is cut off at right angles. This sieve 15 is covered by a cap-shaped machine head containing a wider space or chamber 17 in which the rubber mass moves comparatively slowly and can give off any air bubbles, should they have penetrated as far as this point. The valve 18 serves for leading off such air. Through channel 19 and pipe 20 (which could also be provided with a steam jacket) controlled by valve 21 any desired proportion up to as much as 90 per cent or more of the rubber mass forced through sieve 15 may be tapped off and recirculated into the inlet receptacle 10, where it mixes with freshly supplied mass. The rest of the mass arriving in the space or chamber 17 is forced through a single row of nozzles provided in, or held by, the plate 22. The filaments or threads 23 thus formed are passed through the air and, after having been dried, finally get in touch with the conveyor band 24 by which they are carried off.

It will be noted that the filaments or threads emerging from the nozzles are subjected to a tension due to the weight of the freely suspended portion of the single strands. With suitable rubber masses such tension is capable of further reducing the diameter of the filaments or threads, and the extent of this reduction may be adjusted within certain limits by raising or lowering the conveyor band 24. The pulley 25 carrying this band 24 is therefore mounted on a support 26 adjustably connected with the socket 27.

If I desire to stretch the filaments to a still greater extent I may pass them through a device of the type illustrated in Fig. 2, consisting of at least two pairs of rollers 28, 29 and 30, 31, the rollers 30, 31 rotating at a higher speed than the rollers 28, 29. If, for well-known reasons, the stretching step is desired to be brought about at a higher temperature, the receptacle 32, in which the rollers are arranged, may be filled with warm or hot water or similar expedients.

If a vulcanization of the filaments after the extruding step (or after the stretching step) is desired or required, the filaments may thereafter be passed through a vulcanizing zone.

It will be noted that the receptacle formed by the inlet 10 is large enough to permit the conveyor screw 4 to be operated continuously even if the hydraulic press 11, 12, 13 is temporarily stopped in order to refill it. Threads of unlimited length may therefore readily be produced.

The refining sieves 14, 15 in combination with the recirculating arrangement bring about such an intense refining and re-mixing effect that not only the highly uniform new rubber masses prepared in accordance with the present invention, but also other compositions, even very little uniform ones, may successfully be shaped into uniform threads by the new apparatus.

Ultimately, I wish to remark that a plurality of extruding presses or a press having a plurality of nozzle plates somewhat spaced from each other and comprising a single row of nozzles each may be used in co-operation with a single arrangement of accessories such as band conveyor, stretching device and vulcanizing apparatus.

Wherever "threads" are referred to in the above description and in the claims affixed thereto, this term is intended to designate threads of the usual, circular cross-section as well as such of different, for instance oval or oblong, cross-section, including bands and strips.

Having fully described my invention, what I claim as new and desire to secure by Letters Patent is:

1. In an extruding apparatus for making rubber threads the combination of a press cylinder communicating with a casing forming an inlet chamber for receiving a rubber composition, a set of nozzles communicating with said cylinder, means for exerting pressure within said cylinder and for advancing more rubber composition than the nozzles can accommodate, and a by-pass having a smaller diameter than said casing and connecting a point adjacent to the nozzles with said casing for returning to the rubber composition supply the surplus of the mass not passing through the nozzles.

2. In an extruding apparatus for making rubber threads, the combination of a rubber composition feeding press, a press cylinder communicating with a casing forming an inlet chamber and being connected with said feeding press, a set of nozzles communicating with said cylinder, means for exerting pressure within said cylinder and for advancing more rubber composition than the nozzles can accommodate, a by-pass having a smaller diameter than said casing and connecting a point adjacent to the nozzles with said casing for returning to the rubber composition supply the surplus of the mass not passing through the nozzles, and throttling means arranged in said by-pass.

3. In an extruding apparatus for making rubber threads, in combination with the elements claimed in claim 2, including a refining sieve inserted in the path of the mass discharged by the means for exerting pressure and arranged in advance of the orifice of said by-pass.

4. A method of making rubber threads comprising the steps of adding an ingredient for increasing, by partial coagulation, the degree of viscosity to a latex mass containing not less than 65 per cent of solid constituents, thereafter forming the latex mass having a high degree of viscosity into freely suspended threads, and subjecting the freely suspended threads to air immediately after the forming operation until they are practically dry, thus obviating the use of a coagulating bath.

5. A method of making rubber threads comprising the steps of adding ingredients for vulcanizing, filling and increasing, by partial coagulation, the degree of viscosity to a latex mass containing not less than 65 per cent of solid constituents, thereafter forming the latex mass having a high degree of viscosity into freely suspended threads, and subjecting the freely suspended threads to air immediately after the forming operation until they are practically dry, thus obviating the use of a coagulating bath.

6. A method of making rubber threads comprising the steps of adding a solvent for rubber of the hydrocarbon type as an ingredient for increasing the degree of viscosity to a latex mass containing not less than 65 per cent of solid constituents, thereafter forming the latex mass having a high degree of viscosity into freely suspended threads, and subjecting the freely suspended threads to air immediately after the forming operation until they are practically dry, thus obviating the use of a coagulating bath.

7. A method of making rubber threads comprising the steps of adding a solvent for rubber of the hydrocarbon type, in which solid rubber particles are dissolved, as an ingredient for increasing the degree of viscosity to a latex mass containing not less than 65 per cent of solid constituents, thereafter forming the latex mass having a high degree of viscosity into freely suspended threads, and subjecting the freely suspended threads to air immediately after the forming operation until they are practically dry, thus obviating the use of a coagulating bath.

8. A method of making rubber threads comprising the steps of adding an ingredient for increasing, by partial coagulation, the degree of viscosity to a latex mass containing not less than 65 per cent of solid constituents, thereafter extruding a constant volume per sec. of the latex mass having a high degree of viscosity through nozzles by controlling the head of pressure to closely correspond with any variations in the resistance to flow to produce uniform freely suspended threads, and subjecting the freely suspended threads to air immediately after the forming operation until they are practically dry, thus obviating the use of a coagulating bath.

9. A method of making rubber threads comprising the steps of adding an ingredient for increasing, by partially coagulation, the degree of viscosity to a latex mass containing not less than 65 per cent of solid constituents, thereafter forming the latex mass having a high degree of viscosity into freely suspended threads of a certain diameter, allowing the freely suspended threads to stretch, due to their own weight, to a substantially reduced diameter, and subjecting the freely suspended threads to air immediately after the forming operation until they are practically dry, thus obviating the use of a coagulating bath.

10. A method of making rubber threads comprising the steps of subjecting a viscous rubber composition to a pressing operation, by-passing continuously at least one half of said compressed rubber composition, remixing continuously the by-passed part with freshly entering rubber composition, issuing simultaneously and continuously the non-by-passed remainder of the compressed rubber mixture through extruding orifices to form freely suspended threads, and subjecting the freely suspended threads to air immediately after the forming operation until they are dry, thus obviating the use of a coagulating bath.

MAX DRAEMANN.